United States Patent
Shih et al.

(10) Patent No.: US 12,460,808 B2
(45) Date of Patent: Nov. 4, 2025

(54) MODULAR FLOODLIGHT SYSTEM WITH SUPPLEMENTAL MOTION DETECTION

(71) Applicant: Google LLC, Mountain View, CA (US)

(72) Inventors: Poll Shih, New Taipei (TW); Che-Wei Liu, New Taipei (TW); Chia-Chi Liu, Taipei (TW); Wen-Pin Chou, New Taipei (TW)

(73) Assignee: Google LLC, Mountain View, CA (US)

( * ) Notice: Subject to any disclaimer, the term of this patent is extended or adjusted under 35 U.S.C. 154(b) by 164 days.

(21) Appl. No.: 18/263,832

(22) PCT Filed: Aug. 2, 2021

(86) PCT No.: PCT/US2021/044221
§ 371 (c)(1),
(2) Date: Aug. 1, 2023

(87) PCT Pub. No.: WO2022/177601
PCT Pub. Date: Aug. 25, 2022

(65) Prior Publication Data
US 2024/0310030 A1    Sep. 19, 2024

Related U.S. Application Data

(63) Continuation of application No. 17/178,804, filed on Feb. 18, 2021, now Pat. No. 11,346,539.

(51) Int. Cl.
*H04N 23/51*    (2023.01)
*F21V 23/02*    (2006.01)
(Continued)

(52) U.S. Cl.
CPC .............. *F21V 29/70* (2015.01); *F21V 23/02* (2013.01); *F21V 29/87* (2015.01);
(Continued)

(58) Field of Classification Search
CPC ........ H04N 23/50; H04N 23/51; H04N 23/56; H04N 23/57; H04N 23/61; H04N 23/611; H04N 23/667; F21V 33/0052
See application file for complete search history.

(56) References Cited

U.S. PATENT DOCUMENTS

| 8,492,961 | B2 | 7/2013 | Zeng |
| 9,839,088 | B1 | 12/2017 | Deaton |

(Continued)

FOREIGN PATENT DOCUMENTS

| CN | 202818682 | 3/2013 |
| CN | 106838725 | 6/2017 |

(Continued)

OTHER PUBLICATIONS

"Aluminum LED Heatsink", Accessed online at: https://www.ecvv.com/product/2661165.html?s=p-paying-member on Oct. 22, 2020, 3 pages.

(Continued)

*Primary Examiner* — Daniel M Pasiewicz
(74) *Attorney, Agent, or Firm* — Colby Nipper PLLC

(57) ABSTRACT

This document describes techniques directed to a modular floodlight system with supplemental motion detection. The modular floodlight system includes a camera unit magnetically coupled to an accessory unit. The accessory unit includes passive infrared, PIR, sensors that expand and supplement motion-detection capabilities of the camera unit. For example, the accessory unit PIR sensor provides a PIR field of view, FOV, that is different than the PIR FOV of the camera unit's PIR sensor. Motion detected in either or both of the PIR FOVs is used to cause of change in functionality of the camera system such as, for example, activating image capture by the camera unit and/or activating one or more lights on the modular floodlight system.

20 Claims, 13 Drawing Sheets

(51) Int. Cl.
  *F21V 29/70*    (2015.01)
  *F21V 29/87*    (2015.01)
  *F21V 33/00*    (2006.01)
  *H04N 23/52*    (2023.01)
  *H04N 23/56*    (2023.01)
  *H04N 23/57*    (2023.01)
  *H04N 23/667*   (2023.01)
  *H05B 45/18*    (2020.01)
  *H05B 47/125*   (2020.01)
  *F21Y 113/00*   (2016.01)
  *F21Y 115/10*   (2016.01)

(52) U.S. Cl.
  CPC ......... *F21V 33/0052* (2013.01); *H04N 23/51* (2023.01); *H04N 23/52* (2023.01); *H04N 23/56* (2023.01); *H04N 23/57* (2023.01); *H04N 23/667* (2023.01); *H05B 45/18* (2020.01); *H05B 47/125* (2020.01); *F21Y 2113/00* (2013.01); *F21Y 2115/10* (2016.08)

(56) References Cited

U.S. PATENT DOCUMENTS

| | | |
|---|---|---|
| 10,211,660 B2 | 2/2019 | Underwood et al. |
| 10,529,206 B2 | 1/2020 | Sacre et al. |
| 10,584,863 B1 | 3/2020 | Mittal et al. |
| 11,002,426 B2 | 5/2021 | Liu |
| 11,012,667 B1 | 5/2021 | Nodder |
| 11,346,539 B1 | 5/2022 | Ali et al. |
| 11,602,033 B1 | 3/2023 | Siminoff et al. |
| 11,608,950 B2 | 3/2023 | Mcdowell et al. |
| 11,867,386 B2 | 1/2024 | Ali et al. |
| 12,111,044 B2 | 10/2024 | Shih et al. |
| 12,276,413 B2 | 4/2025 | Ali et al. |
| 2008/0224849 A1 | 9/2008 | Sirhan |
| 2009/0196597 A1 | 8/2009 | Messinger et al. |
| 2009/0244897 A1 | 10/2009 | Anglikowski et al. |
| 2010/0034530 A1 | 2/2010 | Son |
| 2010/0039511 A1 | 2/2010 | Wang |
| 2012/0235579 A1 | 9/2012 | Chemel et al. |
| 2015/0009677 A1 | 1/2015 | Catalano |
| 2015/0362172 A1 | 12/2015 | Gabriel et al. |
| 2016/0127643 A1 | 5/2016 | Huerta et al. |
| 2018/0011390 A1* | 1/2018 | Goulden ............. H04N 23/51 |
| 2018/0013934 A1 | 1/2018 | Germe et al. |
| 2018/0033273 A1 | 2/2018 | Siminoff et al. |
| 2018/0116030 A1 | 4/2018 | Sam et al. |
| 2018/0187828 A1 | 7/2018 | Law et al. |
| 2018/0292056 A1 | 10/2018 | Kim et al. |
| 2018/0332204 A1* | 11/2018 | Chien ............... H04N 7/186 |
| 2019/0011557 A1 | 1/2019 | Weber et al. |
| 2019/0017667 A1 | 1/2019 | Mitchell et al. |
| 2019/0253670 A1* | 8/2019 | Chien ................ F21S 4/28 |
| 2020/0096842 A1 | 3/2020 | Ramones et al. |
| 2020/0201144 A1 | 6/2020 | Ramones et al. |
| 2022/0268434 A1 | 8/2022 | Ali et al. |
| 2024/0085011 A1 | 3/2024 | Ali et al. |
| 2024/0200763 A1 | 6/2024 | Shih et al. |

FOREIGN PATENT DOCUMENTS

| | | |
|---|---|---|
| CN | 108828876 | 11/2018 |
| DE | 202020106405 | 11/2020 |
| JP | 2013109440 A | 6/2013 |
| JP | 6321101 | 3/2017 |
| JP | 2017058631 A | 3/2017 |
| JP | 2017078798 A | 4/2017 |
| JP | 2019530130 A | 10/2019 |
| TW | 201422975 | 6/2014 |
| TW | M555538 | 2/2018 |
| WO | 2022177600 | 8/2022 |
| WO | 2022177601 | 8/2022 |

OTHER PUBLICATIONS

"China LED Heat Sink Aluminium", Accessed online at: https://www.pinterest.com/pin/468022586255226549/?lp=true&nic_v2=1a2S4dfl7 on Oct. 22, 2020, 1 page.
"Foreign Office Action", TW Application No. 111149622, May 23, 2023, 7 pages.
"Foreign Office Action", TW Application No. 110141073, Jun. 10, 2022, 6 pages.
"Foreign Office Action", TW Application No. 110141074, Jul. 6, 2022, 9 pages.
"Foreign Office Action", EP Application No. 21762206.7, Dec. 22, 2022, 4 pages.
"International Search Report and Written Opinion", Application No. PCT/US2021/044221, Nov. 18, 2021, 11 pages.
"International Search Report and Written Opinion", Application No. PCT/US2021/044212, Nov. 2, 2021, 13 pages.
"Non-Final Office Action", U.S. Appl. No. 17/662,827, filed Apr. 27, 2023, 8 pages.
"Non-Final Office Action", U.S. Appl. No. 17/178,804, filed Sep. 29, 2021, 10 pages.
"Notice of Allowance", U.S. Appl. No. 17/178,804, filed Jan. 31, 2022, 8 pages.
Sung, Peggy, "Styron to Participate at LED China in Guangzhou, Showcasing Quality Polycarbonate Resins for Lighting Applications", Accessed online at: https://investor.trinseo.com/investor-relations/news/news-details/2013/Styron-to-Participate-at-LED-China-in-Guangzhou-Showcasing-Quality-Polycarbonate-Resins-for-Lighting-Applications/default.aspx on Oct. 22, 2020, Feb. 22, 2013, 2 pages.
"Non-Final Office Action", U.S. Appl. No. 18/516,220, filed Sep. 13, 2024, 7 pages.
"Notice of Allowance", U.S. Appl. No. 18/263,864, filed Jul. 3, 2024, 8 pages.
"Foreign Office Action", KR Application No. 10-2023-7030190, Oct. 17, 2023, 12 pages.
"International Preliminary Report on Patentability", Application No. PCT/US2021/044221, Aug. 22, 2023, 8 pages.
"Notice of Allowance", U.S. Appl. No. 17/662,827, filed Aug. 17, 2023, 8 pages.
"Preliminary Report on Patentability", Application No. PCT/US2021/044212, Aug. 22, 2023, 8 pages.
"Notice of Allowance", U.S. Appl. No. 18/516,220, filed Dec. 18, 2024, 8 pages.
"Foreign Office Action", JP Application No. 2023-548925, Feb. 6, 2024, 6 pages.

* cited by examiner

MODULAR FLOODLIGHT SYSTEM WITH SUPPLEMENTAL MOTION DETECTION

RELATED APPLICATION(S)

This application is a national stage entry of International Application No. PCT/US2021/044221, filed Aug. 2, 2021, which in turn claims priority to U.S. Non-Provisional application Ser. No. 17/178,804, filed Feb. 18, 2021, the disclosures of which are incorporated herein by reference in their entireties.

BACKGROUND

Floodlights are becoming a popular addition to home security systems. Many security systems include a security camera combined with one or more floodlights. Such security systems may implement sensors in the security camera for motion detection, which may be used to trigger video recording and/or activate the floodlights. Some of these security cameras have limited field of view (FOV) for their motion detection sensor, which, if the security system is mounted on a wall and not in a corner, may result in blind areas to the sides of the security camera where the security camera cannot detect motion usable to trigger video recording and/or activation of the floodlights. Further, depending on the manner in which the security camera is attached to the floodlights, the security camera may have limited articulation, which may reduce the customizability of camera orientation and diminish the user experience.

SUMMARY

This document describes techniques directed to a modular floodlight system with supplemental motion detection. The modular floodlight system includes a camera unit magnetically coupled to an accessory unit. The accessory unit includes passive infrared, PIR, sensors that expand and supplement motion-detection capabilities of the camera unit. For example, the accessory unit PIR sensor provides a PIR field of view, FOV, that is different than the PIR FOV of the camera unit's PIR sensor. Motion detected in either or both of the PIR FOVs is used to cause of change in functionality of the camera system such as, for example, activating image capture by the camera unit and/or activating one or more lights on the modular floodlight system.

In aspects, a camera system is disclosed. The camera system comprises a camera unit including an image sensor configured to capture images or video of a scene. The camera unit also includes a camera unit passive infrared (PIR) sensor having a camera unit FOV extending from the camera system. The camera system also comprises an accessory unit magnetically coupled with the camera unit. The accessory unit includes an accessory unit PIR sensor arranged to have an accessory unit FOV that is different than and which supplements the camera unit FOV of the camera unit PIR sensor. The camera system also includes a processing unit configured to receive sensor readings from the accessory unit PIR sensor and the camera unit PIR sensor, detect motion within at least one of the accessory unit FOV or the camera unit FOV based on the received sensor readings, and cause a change in functionality of the camera system in response to detecting motion within at least one of the accessory unit FOV or the camera unit FOV.

In some implementations, the accessory unit further comprises one or more light subassemblies, and the processing unit is communicatively connected to the accessory unit PIR sensor, the one or more light subassemblies, and the camera unit PIR sensor. Further, the change in functionality of the camera system may include at least one of activation of the one or more light subassemblies to provide light to an environment of the camera system, or activation of the image sensor to begin capturing images or recording video.

In some implementations, the accessory unit FOV of the accessory unit PIR sensor has a horizontal angular range of approximately 180 degrees.

In some implementations, the accessory unit PIR sensor includes two PIR sensors oriented at 60 to 90 degrees relative to one another.

In some implementations, the accessory unit further comprises a substrate mounted to a backside of the accessory unit PIR sensor, wherein the accessory unit PIR sensor includes a plurality of pins grounded by the substrate. In some of these implementations, the substrate is mounted to a flexible printed circuit via one or more surface mount technologies and used as a spacer with shielding for the accessory unit PIR sensor. In addition or as an alternative, in some of these implementations, the accessory unit further comprises a conductive adhesive positioned between the substrate and the accessory unit PIR sensor to ground the accessory unit PIR sensor and the plurality of pins of the accessory unit PIR sensor. In addition or as an alternative, in some of these implementations, the accessory unit further comprises a generally cylindrical metal tube positioned around sidewalls of the accessory unit PIR sensor to provide shielding for the sidewalls of the accessory unit PIR sensor.

In some implementations, the accessory unit further comprises a housing and a PIR lens attached to the housing and having a bowl shape to house the accessory unit PIR sensor.

In some implementations, the camera system further comprises a wallplate configured to be attached to the accessory device and mounted to a surface, wherein the wallplate includes: a trim plate having a disk-like shape with front and back sides, and a mounting gasket, the mounting gasket: having a general ring shape, being assembled to the trim plate, and substantially covering a portion of each of the front and back sides of the trim plate. In some of these implementations, the mounting gasket includes one or more drainage slots defined in an exterior surface of the mounting gasket for enabling water drainage between the exterior surface of the mounting gasket and the surface to which the wallplate is mounted. In addition, in some of these implementations, the mounting gasket includes at least two drainage slots and a channel connecting the at least two drainage slots proximate to an edge of the mounting gasket. In addition, in some of these implementations, the mounting gasket includes at least three drainage slots and a channels connecting the at least three drainage slots proximate to an edge of the mounting gasket, the at least three drainage slots include a middle slot and two outer slots, and the two outer slots include sidewalls that are non-orthogonal to the edge of the mounting gasket to reduce water ingress when the wallplate is rotated about a center axis of the wallplate.

In some of these implementations, the at least three drainage slots and the channel each have a depth substantially within a range of 0.5 mm to 1.5 mm.

In some implementations, the accessory unit further comprises: a power supply unit, a cable connecting the power supply unit to a power source, and a shrink tube positioned around a portion of the cable proximate to a housing of the of the accessory unit to provide rigidity to the cable and prevent the cable from being pinched when the of the accessory unit is assembled to the wallplate.

The details of one or more implementations are set forth in the accompanying drawings and the following description. Other features and advantages will be apparent from the description, the drawings, and the claims. This summary is provided to introduce subject matter that is further described in the Detailed Description. Accordingly, a reader should not consider the summary to describe essential features nor limit the scope of the claimed subject matter.

BRIEF DESCRIPTION OF THE DRAWINGS

The details of one or more aspects of a modular floodlight system with supplemental motion detection are described below. The use of the same reference numbers in different instances in the description and the figures indicate similar elements.

DETAILED DESCRIPTION

Overview

This document describes techniques directed to a modular floodlight system with supplemental motion detection. The modular floodlight system (also referred to as a camera system) includes a floodlight device (also referred to as an accessory unit) and a modular camera system (e.g., modular camera device, camera unit). The floodlight device includes floodlights and motion detection sensors used to activate the floodlights and the modular camera system. In addition, the floodlight device includes a magnetic mount that magnetically secures the modular camera system to the floodlight device. The modular camera system includes a camera device with a rounded exterior surface that magnetically mounts to a concave mounting surface of the floodlight device, which enables 3-axis articulation of the camera device relative to the floodlight device. The floodlight device also provides electrical power to the camera device, the floodlights, and a PIR system on the floodlight device that expands and supplements a PIR capability of the modular camera system.

The modular floodlight system described herein provides a modular design that enables user-friendly installation and setup by consumers, easily adjustable positioning of the camera device relative to the floodlight device, expanded PIR capabilities for the camera device, and interchangeability of the camera device. The modular floodlight system also includes a compact structure that reduces its volume but includes a power supply unit capable of powering the floodlights, the PIR sensors, and the camera device. Further, the magnetic mounting provides increased articulation of the camera device relative to the floodlight device in comparison to many conventional floodlight systems.

Example Operating Environment and System

Figure 1:
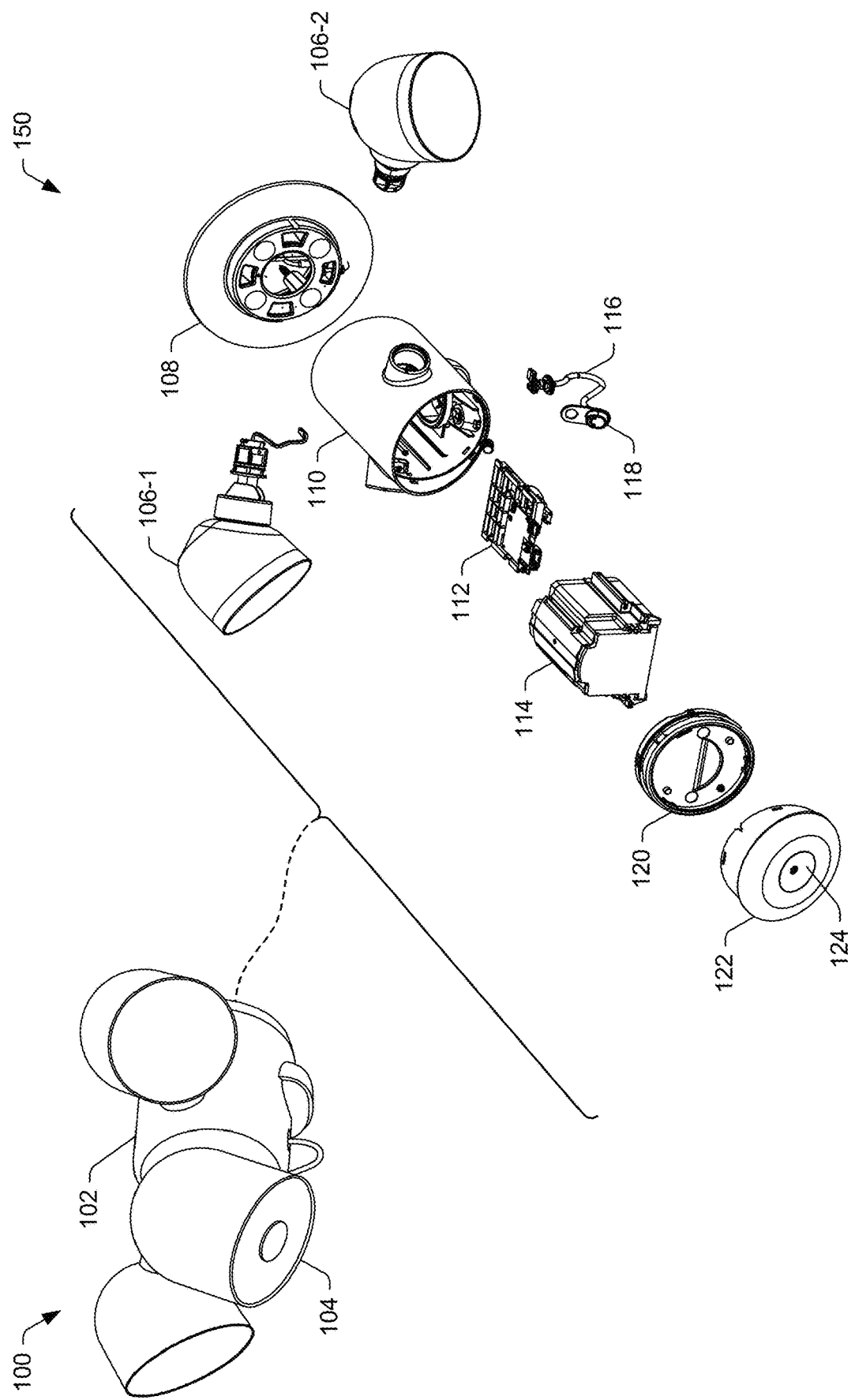
FIG. 1 illustrates an example implementation of a modular floodlight system and an exploded view of some components thereof.

FIG. 1 illustrates an example implementation of a modular floodlight system 100 and an exploded view 150 of some components thereof. The modular floodlight system 100 may include a floodlight device 102 configured to communicate with, and be connected to, a modular camera system (e.g., camera device 104) that is removably assembled to the floodlight device 102. In aspects, the camera device 104 is integrated into the modular floodlight system 100 via a magnetic force that magnetically and removably secures the camera device 104 to the floodlight device 102 (e.g., a magnet inside the floodlight device 102 acts on a metal part (not shown) inside the camera device 104). The camera device 104 includes a housing having a general cup shape with a rounded closed end and an image sensor at an opposing end. The floodlight device 102 may also include one or more light subassemblies 106 configured to provide a wide illumination range to an environment of the modular floodlight system 100. In an example, the floodlight device 102 may include a first light subassembly 106-1 and a second light subassembly 106-2. A wallplate 108 is configured to be affixed to a wall, in particular to a junction box having electrical wiring connected to a power source. The wallplate 108 may be configured to adapt to different configurations of junction boxes.

The floodlight device 102 includes a main housing 110 that connects to the wallplate 108. In one example, the main housing 110 is secured to the wallplate via a twist lock mechanism (e.g., formed via protrusions mating with apertures or channels and locking into place via a twist motion of the main housing 110, relative to the wallplate 108). The main housing 110 is a generally cylindrical shell that may be formed from plastic via one or more injection molding techniques. The main housing 110 includes a first end (e.g., front end for mounting a modular camera system) and a second end (e.g., back end for assembling to the wallplate 108). The shell may be generally cylindrical about a longitudinal axis that intersects the first and second ends. In some aspects, the shell may have any suitable shape for a cross-section, including a triangular shape, a rectangular shape, a trapezoidal shape, elliptical shape, and so forth. The first and second light subassemblies 106-1 and 106-2, respectively, are attached to opposing sides (e.g., lateral sides) of the main housing 110. In the illustrated examples, the lateral sides of the main housing 110 are sides of the main housing 110 that do not intersect the longitudinal axis of the cylindrical shape of the main housing 110.

The floodlight device 102 may include a PIR module 112 and a power supply unit (PSU) 114. The PIR module 112 is configured to detect motion within a range of the floodlight device 102. The PSU 114 is configured to provide power to one or more components, including the PIR module 112, the light subassemblies 106, and the camera device 104. In an example, the PSU 114 provides electrical power to the camera device 104 via a cable 116 (e.g., a pogo cable) with a connector 118 (e.g., connector having pogo pins) that connects to the camera device 104.

Also, the floodlight device 102 includes an inner frame subassembly 120 and a magnet mount assembly 122. The magnet mount assembly 122 is configured to receive and support the camera device 104 via a magnetic force of a magnet inside the magnet mount assembly 122 acting on a metal part (or multiple metal parts) inside the camera device 104. The inner frame subassembly 120 is configured to shield the PSU 114 from a magnetic field associated with the magnetic force generated by the magnet. As described in further detail herein, the magnet mount assembly 122 includes a concave surface 124 for receiving a complementary convex exterior surface of the rounded closed end of the camera device 104. Because the exterior surface of the camera device 104 is rounded and magnetically affixed to the concave surface 124 of the magnet mount assembly 122 by the magnetic force, the camera device 104 can be reoriented (e.g., rotated, tilted, panned) in three axes relative to the main housing 110 to redirect its field of view. Further details are described in relation to FIG. 2.

Figure 2:
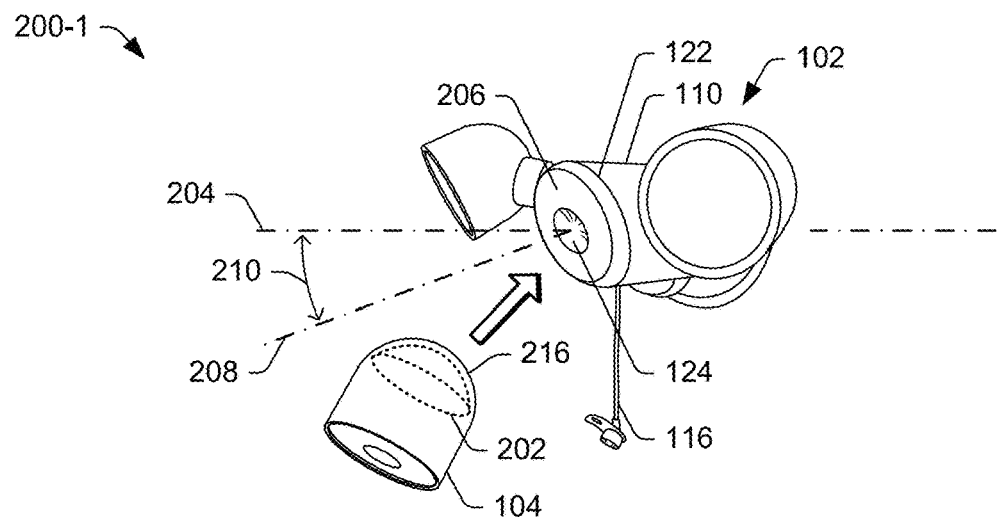
FIG. 2 illustrates examples of the modular floodlight system from FIG. 1 supporting the camera device in different orientations.
Figure 2:
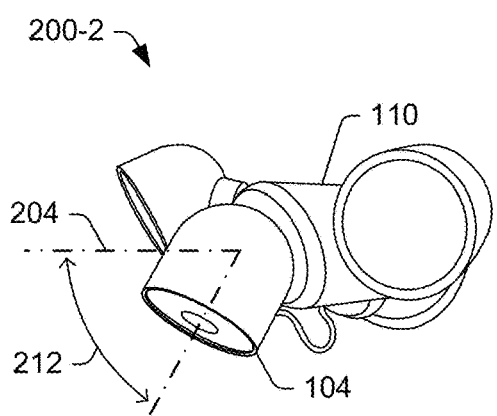
Figure 2:
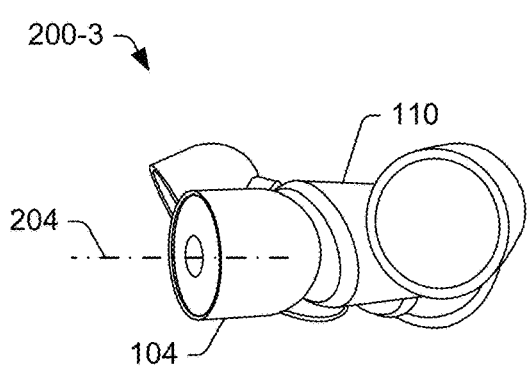
Figure 2:
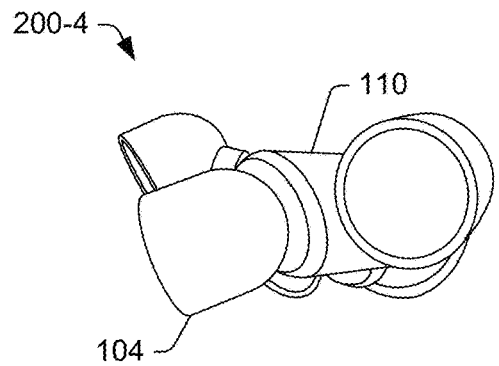
Figure 2:
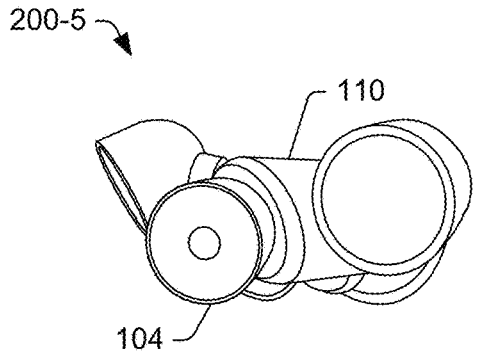

FIG. 2 illustrates examples (e.g., examples 200-1, 200-2, 200-3, 200-4, and 200-5) of the modular floodlight system 100 from FIG. 1 supporting the camera device 104 in different orientations. In example 200-1, the camera device 104 is being magnetically mounted to the floodlight device 102 based on a magnet inside the main housing 110 acting on a metal part (e.g., metal part 202) located within a housing of the camera device 104. The main housing 110 of the floodlight device 102 includes a longitudinal axis (e.g., a central axis 204). In the illustrated example, the central axis 204 is substantially horizontal based on an assumption that the floodlight device 102 is mounted to a wall (not shown). Accordingly, the central axis 204 may be substantially orthogonal to a surface on which the floodlight device 102 (or the wallplate 108) is mounted.

The magnet mount assembly 122 includes a front surface 206 defining a plane that is non-orthogonal to the central axis 204 of the main housing 110. Rather, the front surface 206 is tilted to face a direction (e.g., axis 208 is normal to the front surface 206) that is approximately 20 degrees below the central axis 204, or below a plane (e.g., a horizontal plane) that is parallel with the central axis 204. For example, the axis 208 and the central axis 204 form a tilt angle 210 of approximately 20 degrees. However, any suitable tilt angle 210 can be implemented, including a non-zero angle up to approximately 45 degrees.

The tilt angle 210 of the front surface 206 relative to the central axis 204 of the main housing 110 is used in combination with the camera device 104 to provide a range of tilt of the camera device 104 of approximately zero to 60 degrees below the central axis 204 for an FOV of approximately 130 degrees diagonal (e.g., 110 degrees horizontal and 56 degrees vertical). The determination of the tilt angle 210 is based on several factors, including an FOV of an image sensor of the camera device 104, an average height expected for the camera device 104 to be mounted above ground by users, the length of the cable 116, and so forth. For example, based on an assumption that the main housing 110 is to be mounted to a vertical wall, the camera device 104 may have a range of tilt between zero and 60 degrees below a horizontal plane. Further, the length of the cable 116 is sufficient for the camera device 104 to rotate upward (toward the central axis 204) to have a zero-degree tilt angle and +30-degree pan angle relative to the central axis 204. In addition, the tilt angle 210 enables increased articulation of the camera device 104 for the user to direct or position the camera device 104 in a particular orientation. For instance, the camera device 104 may be oriented to enable the FOV of the image sensor of the camera device 104 to include an area that is directly below the main housing 110 and proximate to the wall to which the main housing 110 is mounted.

Examples 200-2 and 200-3 illustrate the range of tilt of the camera device 104 relative to the main housing 110 of the floodlight device 102. In example 200-2, the camera device 104 is facing downward. The camera device 104 may tilt downward to an angle (e.g., angle 212) of approximately 60 degrees relative to the central axis 204 of the main housing 110. In example 200-3, the camera device 104 is facing a substantially horizontal direction or a direction substantially parallel to the central axis 204 of the main housing 110.

Examples 200-3 and 200-4 illustrate the range of pan of the camera device 104 relative to the main housing 110 of the floodlight device 102. In example 200-4, the camera device 104 is turned toward the left of the illustration. In example 200-5, the camera device 104 is turned toward the right of the illustration. When reorienting the camera device 104, the exterior convex surface of the camera device 104 may slide on the concave surface 124 of the magnet mount assembly 122, enabling the magnet on the inside of the magnet mount assembly 122 to act on a different portion of the metal part 202, or on a different metal part, inside the camera device 104. In this way, the camera device 104 may pivotally move relative to a pivot point, which may be a location within the camera device (e.g., at a center of curvature of the exterior convex surface of the camera device). In particular, the 3-axis articulation of the camera device 104 is pivoted at the center of curvature of the convex exterior surface of the camera device 104.

The range of pan of the camera device 104 relative to the main housing 110 may be defined by one or more characteristics (e.g., a radius of curvature, diameter, depth) of the concave surface 124 of the magnet mount assembly 122 in combination with the geometry of a mounting surface 216 of the camera device 104 itself, including a radius of curvature of the mounting surface 216, a diameter of the mounting surface 216, a size (e.g., area) of the mounting surface 216, and so on. In an example, the camera device 104 may have a range of pan of approximately 60 degrees to approximately-60 degrees relative to the central axis 204.

The range of tilt may also be defined by the one or more characteristics of the concave surface 124 of the magnet mount assembly 122 in combination with the geometry of the mounting surface 216 of the camera device. In some instances, the range of tilt may be further defined by a length of the cable 116, which electrically connects the camera device 104 to the PSU 114.

Figure 3:
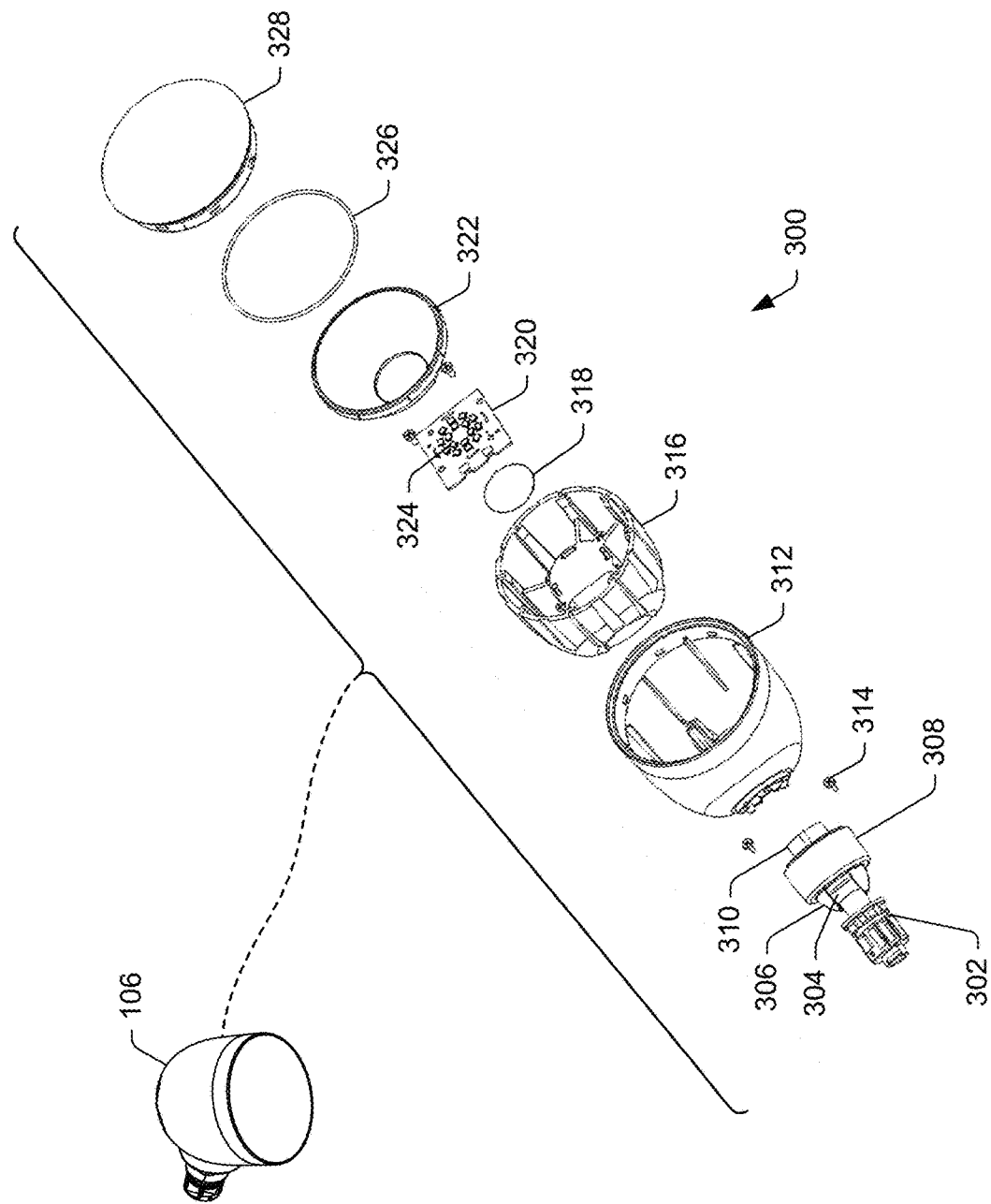
FIG. 3 illustrates an exploded view of the light subassembly from FIG. 1.

FIG. 3 illustrates an exploded view 300 of the light subassembly 106 from FIG. 1. The light subassembly includes a hinge 302 with a rounded end 304 that is usable in combination with a ball cap 306 and a ball cover 308 to form a hinge (e.g., ball joint), which is pivotally movable in up to three different axes. The ball cover 308 connects to a holder 310, which connects to a light housing 312. In aspects, the ball cover 308 fastens (e.g., threads onto) to the holder 310. As the ball cover 308 is tightened on the holder 310, the ball cover 308 provides a compression force onto the ball cap 306, which in turn provides a clamping force on the rounded end 304 of the hinge 302. Accordingly, the user can loosen the ball cover 308 to pivotally reposition the light subassembly 106 about the hinge 302 and relative to the main housing 110 in FIG. 2. The holder 310 may be attached to the light housing 312 via one or more fasteners 314 (e.g., screws). To prevent water ingress, a rubber seal may be positioned between the holder 310 and the light housing 312. In addition, the hinge 302 (and the rounded end 304) is hollow. For example, the hinge 302 may define an aperture that is coaxial with a longitudinal axis of the hinge 302 to enable electrical wires to pass through the aperture. In some implementations, a seal may be positioned around the electrical wires and within the aperture of the hinge 302 to prevent water ingress. The seal may be glued inside the aperture of the hinge 302 to secure the seal in place.

The light housing 312 has a general cup shape with an open end and a rounded, closed end. In the illustrated example, the light housing 312 is a generally cylindrical shell with a rounded cap. The light housing 312 may be plastic and formed from injection molding techniques. In addition, the light subassembly 106 includes a heatsink 316 that fits inside the light housing 312. The heatsink 316 has a shape that is generally complementary to an interior surface of the light housing 312 (e.g., generally cylindrical with a rounded end). The heatsink 316 also defines a cavity to house various components including a thermal interface material 318, a light-emitting diode (LED) board 320, and a reflector 322. The LED board 320 includes an array of LEDs 324 to provide light. The reflector 322 is used to reflect the light provided by the array of LEDs 324. A seal 326 (e.g., O-ring) may be included to prevent water ingress between a lens 328 and the light housing 312. The lens 328 may be any suitable lens for a floodlight.

Figure 4:
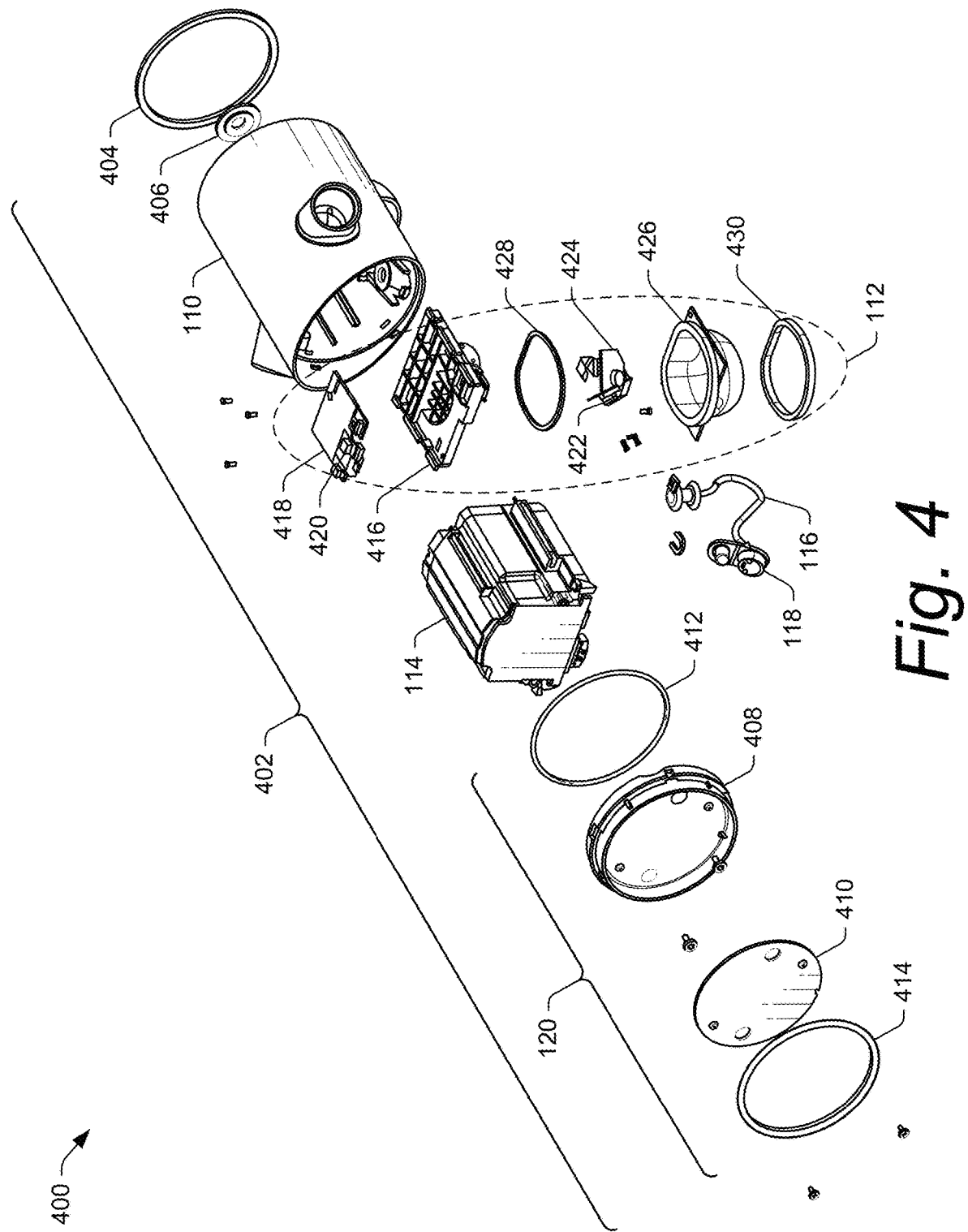
FIG. 4 illustrates an exploded view of a main housing assembly of the floodlight device from FIG. 1.

FIG. 4 illustrates an exploded view 400 of a main housing assembly 402 of the floodlight device 102 from FIG. 1. The main housing assembly 402 includes the inner frame subassembly 120, the PSU 114, the PIR module 112, the cable 116, and the main housing 110. In some aspects, the main housing assembly 402 also includes a rubber seal 404 and a gasket 406. The rubber seal 404 provides a water seal between the main housing 110 and the wallplate 108 (in FIG. 1) The gasket 406 covers a portion of an aperture in the main housing 110 through which electric wires (not shown) are routed into the main housing 110 from a power source.

The inner frame subassembly 120 includes an inner frame 408 with a magnet shielding component 410. The inner frame 408 may be a generally cylindrical shell with an open end and an opposing closed end, defining a recessed area within the shell. The magnet shielding component 410 may have a disk-like shape and be supported within the recessed area of the inner frame 408. The magnet shielding component 410 is positioned between the PSU 114 and the magnet mount assembly 122 (shown in FIG. 1) to help protect the PSU 114 from a magnetic field generated by a magnet in the magnet mount assembly 122. The inner frame subassembly 120 may also include a gasket 412 to provide a watertight seal between the inner frame 408 and the main housing 110. The inner frame subassembly 120 may also include a gasket 414 to provide a watertight seal between the inner frame 408 and the magnet mount assembly 122 from FIG. 1.

The PIR module 112 includes a PIR holder 416 having a surface for mounting a PIR board 418 populated with a processing unit (e.g., microcontroller unit (MCU) 420). The MCU 420 may be communicatively connected to multiple PIR sensors 422 (also referred to as accessory unit PIR sensors) and configured to operate the PIR sensors 422. The MCU 420 may also be communicatively connected to the light subassemblies 106 and a mounted device (e.g., the camera device 104). The PIR sensors 422 are attached to a PIR flex component 424 that is assembled to the PIR holder 416. In this way, the PIR holder 416 is positioned between the MCU 420 and the PIR flex component 424. A PIR lens 426 covers the PIR sensors 422 and is affixed to the PIR holder 416 (e.g., the PIR lens 426 has a bowl shape forming a cavity that houses the PIR sensors 422 and the PIR flex component 424). A gasket 428 may be positioned between the PIR lens 426 and the PIR holder 416. Another gasket 430 may be positioned between the PIR lens 426 and the main housing 110. The main housing 110 includes an aperture on a bottom side of the main housing 110 through which the PIR lens 426 is positioned. In this way, the PIR lens 426 attaches to an interior surface of the main housing 110, and the PIR sensors 422 (positioned within the PIR lens 426) are positioned outside of the cylindrical shell of the main housing 110.

Figure 5:
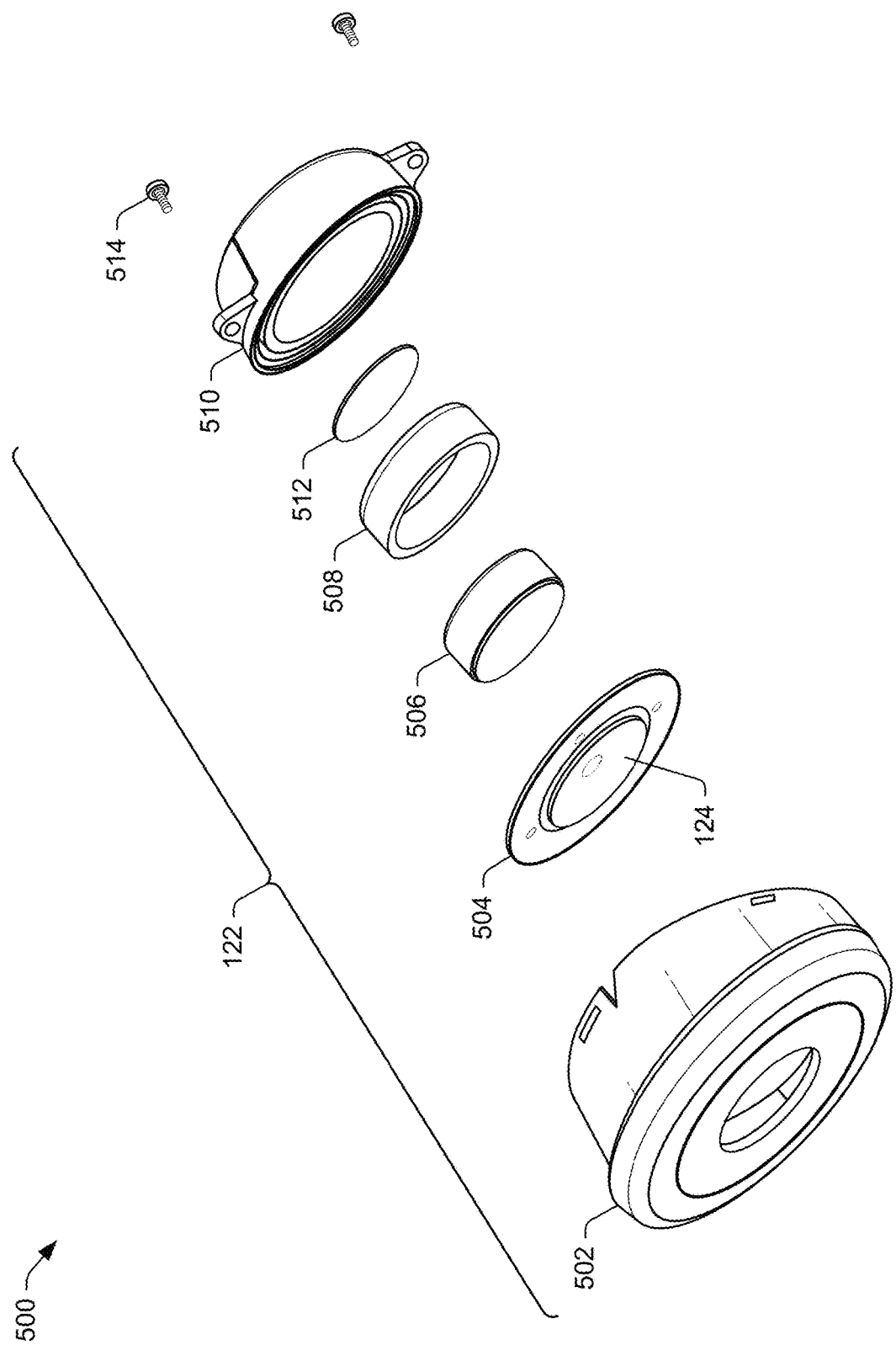
FIG. 5 illustrates an exploded view of the magnet mount assembly from FIG. 1.

FIG. 5 illustrates an exploded view 500 of the magnet mount assembly 122 from FIG. 1. The magnet mount assembly 122 includes a front cover 502, a mounting component 504, a magnet 506, a magnet shroud 508, and a magnet holder 510. In aspects, the magnet shroud 508 is affixed to the magnet holder 510 via adhesive 512 (e.g., pressure-sensitive adhesive (PSA)). The magnet holder 510 may be affixed to the front cover 502 via one or more fasteners 514 (e.g., screws). The magnet holder 510 defines a cavity that houses the mounting component 504, the magnet 506, and the magnet shroud 508.

The magnet shroud 508 supports the magnet 506 within a recessed area to cover the back and sides of the magnet 506 and block a magnetic field, generated by the magnet 506, from reaching the PSU 114 positioned on an opposing side of the magnet shroud 508 from the magnet 506 (as shown in FIG. 1). The magnet shroud 508 does not cover a front of the magnet 506.

The mounting component 504 includes a flexible material forming a contact surface for mounting the camera device 104. In aspects, the mounting component 504 provides a flexible concave surface (e.g., the concave surface 124) between the magnet 506 and a mounted device (e.g., the camera device 104). The concave surface 124 may be complementary to the convex exterior surface of the camera device 104. The mounting component 504 may have a planar surface opposite the concave surface 124, where the planar surface abuts the magnet 506.

Figure 6:
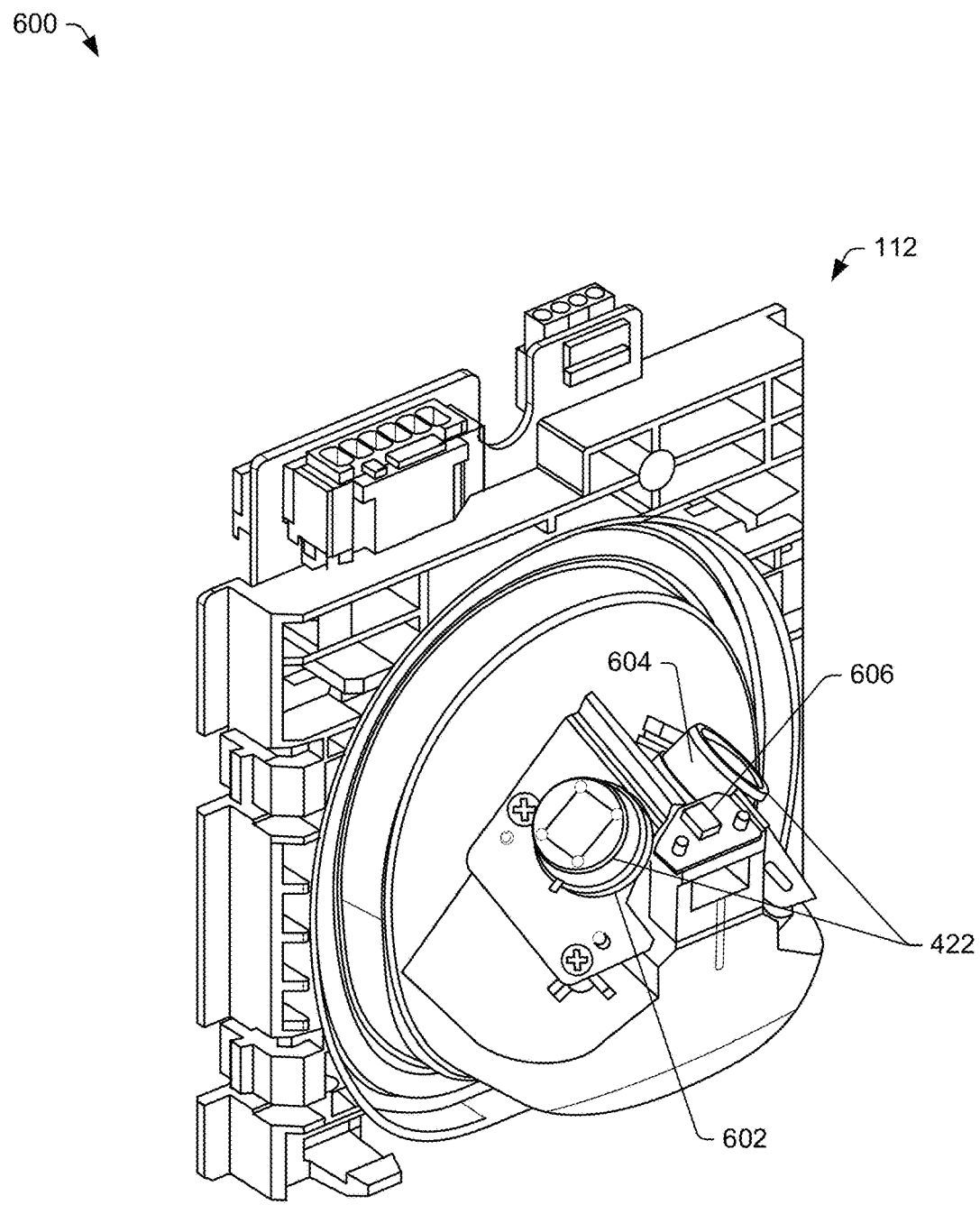
FIG. 6 illustrates an enlarged view of the PIR module from FIG. 1.

FIG. 6 illustrates an enlarged view 600 of the PIR module 112 from FIG. 1. As illustrated, the PIR sensors 422 are oriented at 60 to 90 degrees from one another, such that the PIR sensors 422 face away from each other. This 60 to 90 degree offset in orientation provides an overall FOV having a horizontal angular range of approximately 180 degrees. Accordingly, when the floodlight device 102 (in FIG. 1) is mounted to a wall, the overall FOV of the PIR sensors 422 captures an area that includes both the left and right sides of the floodlight device 102 proximate to the wall. An example of the FOV of the PIR sensors 422 is illustrated in FIG. 7.

To prevent noise, the PIR sensors 422 are grounded and include shielding. A substrate 602 (e.g., printed circuit board (PCB)) is added under each PIR sensor 422 to ground pins of the PIR sensor 422. In an example, the PIR sensors 422 each include four pins on the backside of the PIR sensor 422. The substrate 602 is mounted to a flexible printed circuit (FPC) via one or more surface mount technologies (SMT) and used as a spacer with shielding for the PIR sensor 422. Also, conductive adhesive may be positioned on the backside of the PIR sensor 422 (e.g., between the PIR sensor and the substrate 602) to ground the PIR sensor 422 and its pins. Additional shielding 604 may be added to ground sidewalls of the PIR sensor 422. The additional shielding 604 may include a generally cylindrical metal tube positioned around the sidewalls of the PIR sensor 422. Grounding and shielding the PIR sensor 422 in this manner significantly reduces the effects of noise on the performance of the PIR sensors 422.

An ambient light sensor 606 may be included on the PIR holder 416 and positioned between the PIR sensors 422. In this configuration, the ambient light sensor 606 is directed forward (e.g., aligned horizontally with the central axis 204 of the main housing 110) and tilted downward at an angle from the central axis 204 of the main housing 110.

Figure 7:
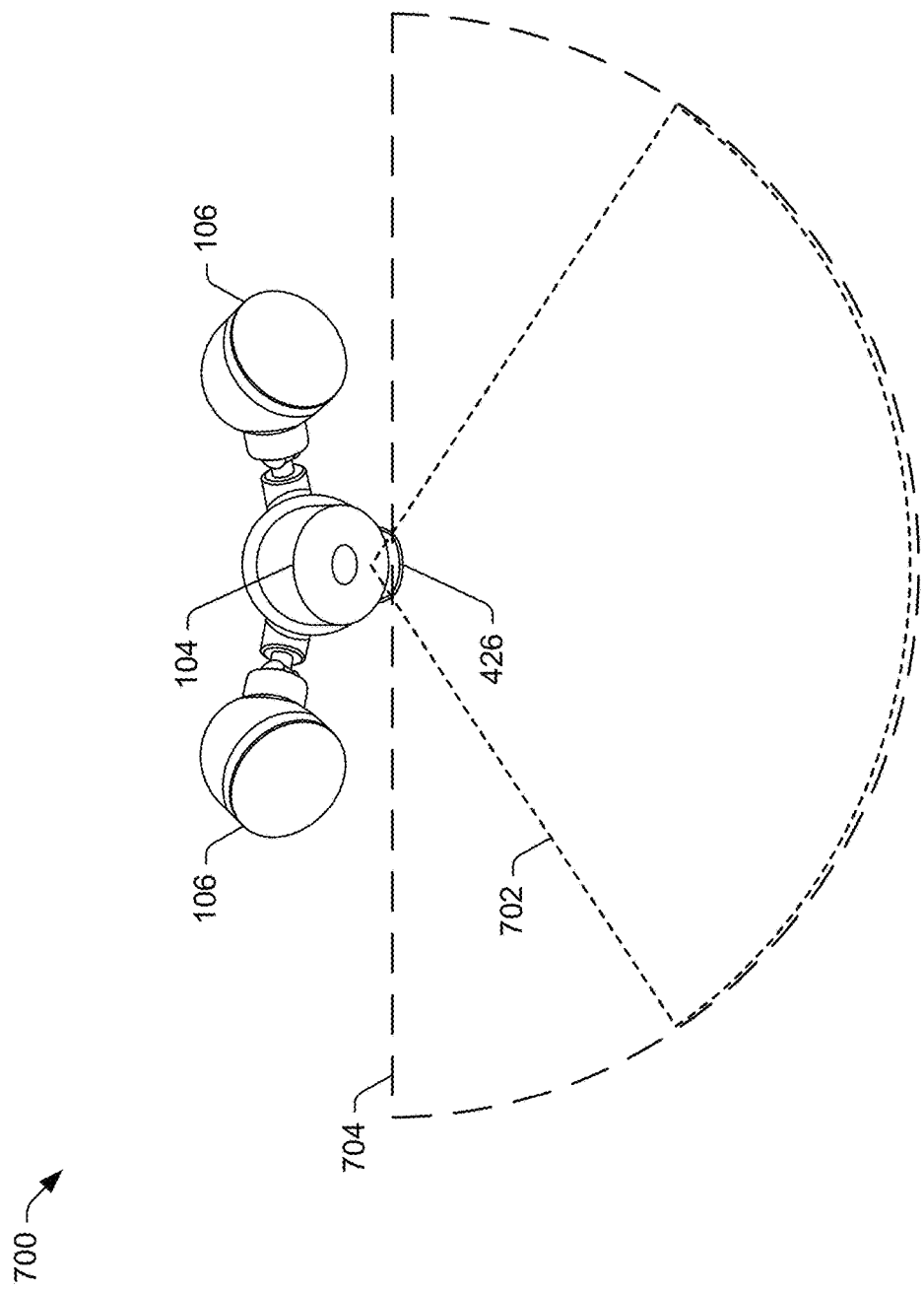
FIG. 7 illustrates an example implementation of the floodlight device from FIG. 1 in accordance with an FOV of the PIR sensors and an FOV of a PIR sensor within the camera device mounted to the floodlight device.

FIG. 7 illustrates an example implementation 700 of the floodlight device 102 from FIG. 1 in accordance with an FOV of the PIR sensors 422 and an FOV of a PIR sensor (e.g., camera unit PIR sensor) within the camera device 104 mounted to the floodlight device 102. The camera device 104 may have a built-in PIR sensor (e.g., a camera unit PIR sensor) for detecting motion within a camera PIR FOV (e.g., first PIR FOV 702) extending from the camera system. A conventional PIR sensor generally has a PIR FOV with an angular range of approximately 120 degrees. The PIR sensors 422 (from FIG. 6 and positioned behind the PIR lens 426) on the floodlight device 102 have a PIR FOV (e.g., second PIR FOV 704) extending from the camera system and being different (e.g., broader) than the first PIR FOV 702. The second PIR FOV 704 and the first PIR FOV 702 may extend from the camera system from approximately the same point in space (e.g., from the camera system). In one example, the first PIR FOV 702 and the second PIR FOV 704 extend from focal points (e.g., respective PIR sensors on the camera system) that are less than 6 inches (0.1524 meters (m)) from one another. Considering FOV angular range, the second PIR FOV 704 may have an angular range of approximately 180 degrees (horizontal). Further, the second PIR FOV 704 may have an approximate 30-degree vertical FOV. In an example, if the floodlight device 102 is mounted at a height within a range of 1.8 to 3 m, the PIR sensors 422 may detect a person walking (e.g., 0.9 m/s) up to a distance of approximately 7.6 m away from the PIR sensors 422. Continuing the example, the PIR sensors 422 may have a range of approximately 7.6 m at zero degrees pan (relative to the central axis 204 of the main housing 110) and 4.5 m at a 180 degrees pan (relative to the central axis 204).

Because the PIR sensors 422 have a broader PIR FOV than that of the modular camera system (e.g., the camera device 104), the floodlight device 102 expands the PIR capability of the modular camera system. In this way, the processing unit (e.g., the MCU 420) of the camera system (e.g., the floodlight device 102 coupled with the camera device 104) may receive sensor readings from the PIR sensors 422 and the camera unit PIR sensor and if motion is detected within at least one of the first PIR FOV 702 or the second PIR FOV 704, the processing unit may responsively cause a change in functionality (e.g., trigger a function) of the camera system. In an example, the PIR sensors 422 of the floodlight device 102 may detect motion outside the first PIR FOV 702 of the camera device 104 and, based on detection of motion by the PIR sensors 422, the MCU 420 may then activate (e.g., turn on) the LEDs in the light subassemblies 106 to provide light to the environment around the floodlight device 102. In addition, the floodlight device 102 can signal the camera device 104 to activate its image sensor and begin capturing images or recording video of a scene viewed through a camera lens of the camera device 104, which may help the camera device 104 to anticipate an object moving into the FOV of the image sensor by initiating video recording before the object enters the image sensor's FOV. This expanded PIR FOV (e.g., the second PIR FOV 704) provided by the PIR sensors 422 of the floodlight device 102 provides a consistent and broad FOV for motion detection for the light subassemblies 106 of the floodlight device 102 and for the pivotally movable and modular camera device 104. Accordingly, the camera device 104 can be reoriented (as described with respect to FIG. 2) without leaving blind spots in the PIR FOV because the second PIR FOV 704 maintains coverage of areas outside of the first PIR FOV 702.

Figure 8:
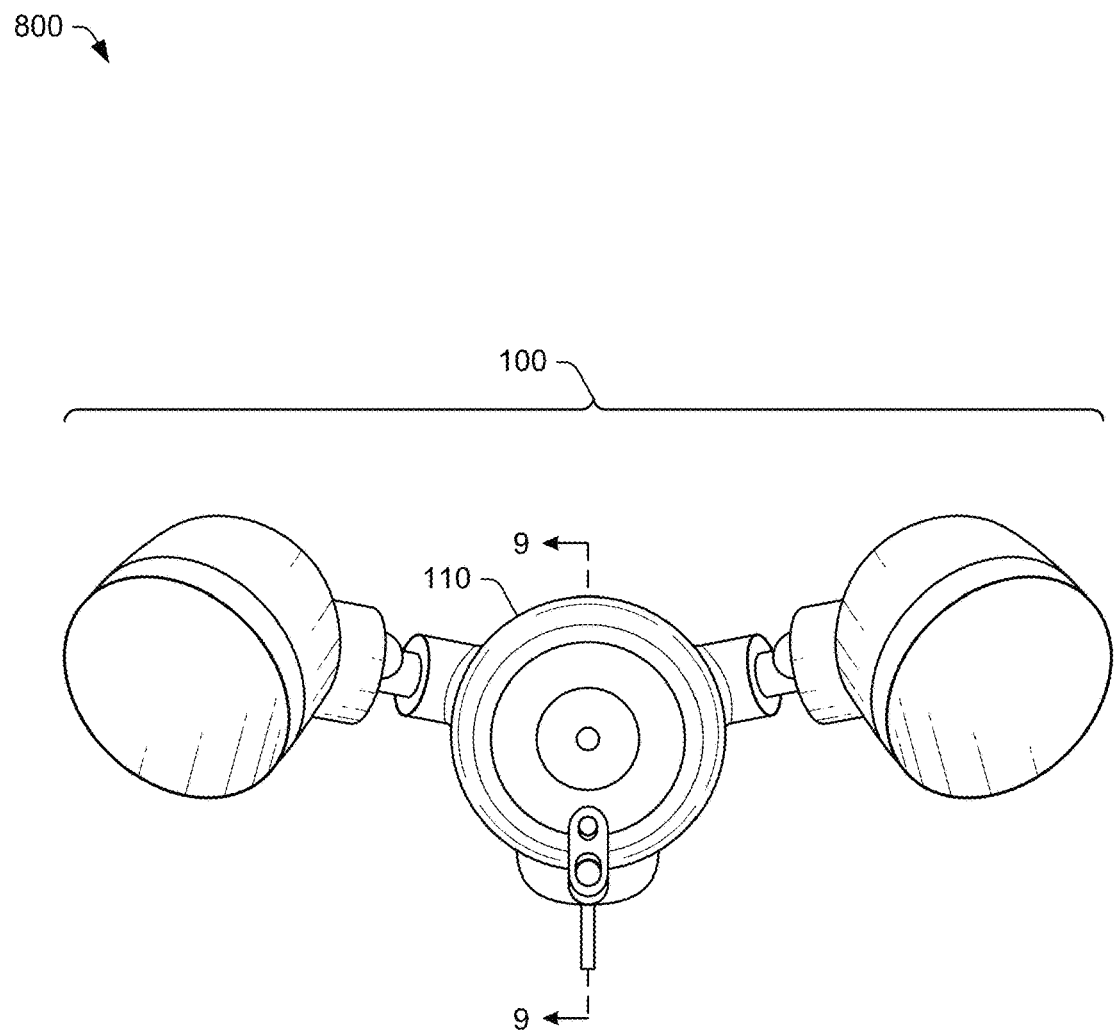
FIG. 8 illustrates a front elevational view of the floodlight device from FIG. 1.

FIG. 8 illustrates a front elevational view 800 of the floodlight device 102 from FIG. 1. As illustrated, the hinge connecting each light subassembly 106 to the main housing 110 enables the light subassembly 106 to pivotally move in up to three axes of rotation. Accordingly, the hinge enables the light subassembly 106 to be easily adjustable by the consumer.

Figure 9:
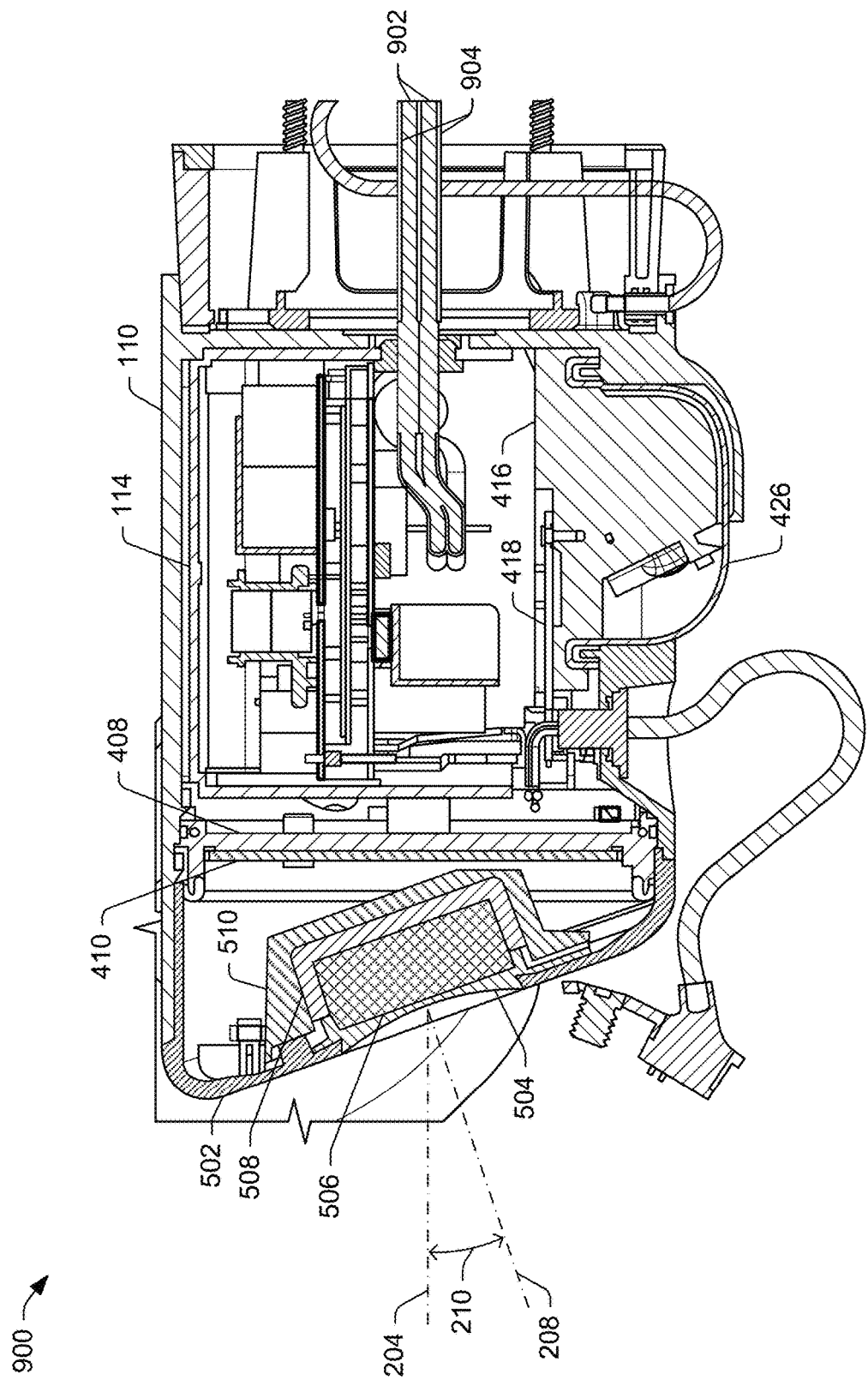
FIG. 9 illustrates a sectional view of the main housing of the floodlight device from FIG. 8, taken along line 9-9.

FIG. 9 illustrates a sectional view 900 of the main housing 110 of the floodlight device 102 from FIG. 8, taken along line 9-9. As illustrated, the main housing 110 of the floodlight device 102 includes a compact architecture that provides a reduction in size compared to that of some conventional floodlights, a modular structure having a magnetic mount that enables 3-axis articulation (e.g., rotation about three axes in a cartesian coordinate system) of a modular camera system, and an expanded PIR FOV for the modular camera system. The floodlight device 102 may also provide line power to the modular camera system.

As illustrated in FIG. 9 (and as described in FIG. 2), the front surface 206 of the magnet mount assembly 122 defines a plane that is tilted relative to the central axis 204 by a tilt angle that is substantially within a range of 10 to 30 degrees (e.g., 20 degrees) below the central axis 204. In addition, the magnet holder 510 is attached to an interior surface of the front cover 502 and supports the magnet shroud 508 within a recessed area of the magnet holder 510. The magnet 506 is supported by and positioned at least partially within the magnet shroud 508. The magnet 506 and the magnet shroud 508 are positioned between the magnet holder 510 and the interior surface of the front cover 502. Further, the mounting component 504 is positioned between the magnet 506 and the front cover 502 and provides the contact surface for mounting the camera device 104 (from FIG. 1). Behind the magnet holder 510 (e.g., between a backside of the magnet holder 510 and the PSU 114) is the inner frame 408 and the magnet shielding component 410. Accordingly, both the magnet shroud 508 and the magnet shielding component 410 are located between the magnet 506 and the PSU 114 to protect the PSU 114 from the magnetic field generated by the magnet 506.

The PIR holder 416 is positioned within the main housing 110 and below the PSU 114. The PIR board 418 is located between the PSU 114 and the PIR holder 416. As described, the PIR holder 416 is positioned within an aperture in the main housing 110 and supports the PIR sensors 422 in an orientation that enables the PIR sensors 422 to transmit and receive PIR signals to and from an environment surrounding the main housing 110. The PIR lens 426 augments the FOV of the PIR sensors 422 and also protects the PIR sensors 422 from debris, dust, and moisture. The PIR lens 426 may be any suitable lens that is IR translucent, including a Fresnel lens.

Because of the twist lock formed between the main housing 110 and the wallplate 108, a cable (e.g., electrical wires 902) of the PSU 114 may get pinched during installation due to twisting of the cable. To prevent the electrical wires 902 from being pinched, a shrink tube 904 is implemented around a portion of the electrical wires 902 proximate to the second end of the main housing 110. The shrink tube 904 may be any suitable material (e.g., heat shrink material) that provides rigidity to protect the electrical wires 902 from being pinched when the main housing 110 is assembled (via the twist lock mechanism) to the wallplate 108. In aspects, the shrink tube 904 may cover any suitable length of the electrical wires 902, including a length substantially within a range of 10 mm to 50 mm.

Figure 10:
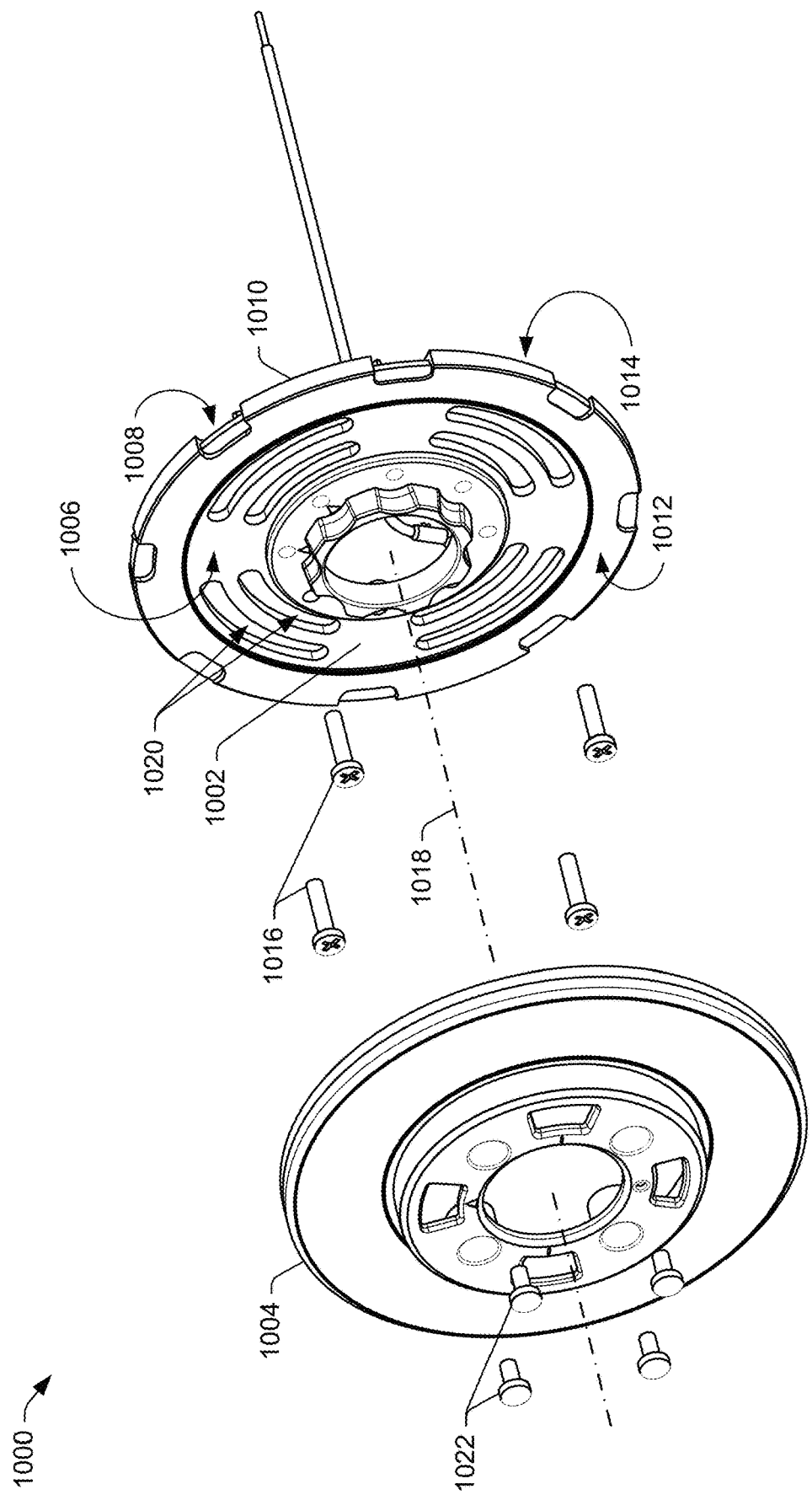
FIG. 10 illustrates an exploded view of the wallplate from FIG. 1.

FIG. 10 illustrates an exploded view 1000 of the wallplate 108 from FIG. 1. The wallplate 108 includes a trim plate 1002 and a cover plate 1004. The trim plate 1002 has a disk-like shape with front and back sides (e.g., front side 1006 and back side 1008) and is configured to be affixed to a surface (e.g., a wall or a junction box in the wall). The trim plate 1002 includes a mounting gasket 1010 that is assembled to the trim plate 1002 and substantially covers the periphery of the trim plate 1002, including at least a portion of each of the front and back sides 1006 and 1008, respectively. The mounting gasket 1010 has a general ring shape with a C-shaped cross-section for covering the edges of the trim plate 1002. Further, the mounting gasket 1010 includes a front exterior side 1012 that abuts the cover plate 1004 and forms a watertight seal with the cover plate 1004 when the wallplate 108 is assembled. The mounting gasket 1010 also includes a rear exterior side 1014 that, when the wallplate 108 is mounted to a surface (e.g., a wall), is configured to abut and form a seal with that surface. The trim plate 1002 may be affixed to the junction box via any suitable fastener, including fasteners 1016. Further, the trim plate 1002 is configured to be rotatably adjusted about a center axis (e.g., center axis 1018) by +45 degrees to conform to different configurations of junction boxes by positioning the fasteners 1016 in curved slots 1020. In aspects, the cover plate 1004 is fastened to the trim plate 1002 via fasteners (e.g., fasteners 1022).

Figure 11:
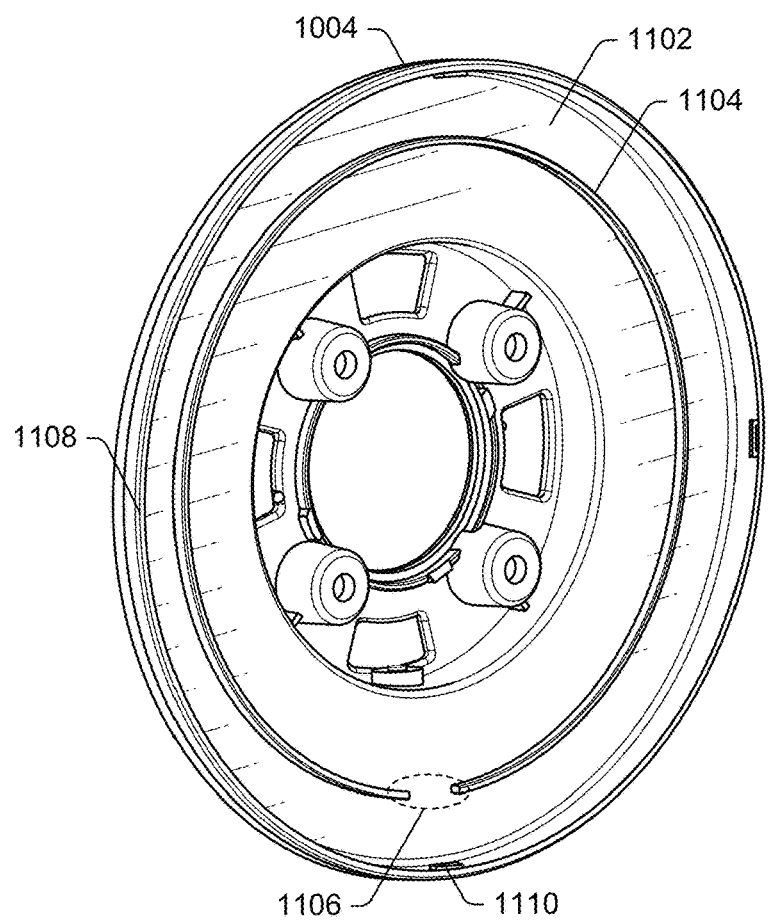
FIG. 11 illustrates a backside view of the cover plate from FIG. 10.

FIG. 11 illustrates a backside view 1100 of the cover plate 1004 from FIG. 10. The cover plate 1004 includes backside surface 1102 and a rim 1104 projecting from the backside surface 1102. The rim 1104 is configured to interface with the mounting gasket 1010 in FIG. 10 to create a watertight seal. The rim 1104 includes a notch (e.g., notch 1106) to enable water drainage. The cover plate 1004 includes a perimeter wall 1108 surrounding the backside surface 1102 to create a recessed area to receive and support the mounting gasket 1010. The perimeter wall 1108 defines an aperture (e.g., drainage hole 1110) that provides a path for water to drain out of the cover plate 1004. When mounted to a wall, the cover plate 1004 may be oriented to have the notch 1106 located at a lowest point of the rim 1104 and the drainage hole 1110 located at a lowest point of the perimeter wall 1108, to enable water to drain out due to gravity.

Figure 12:
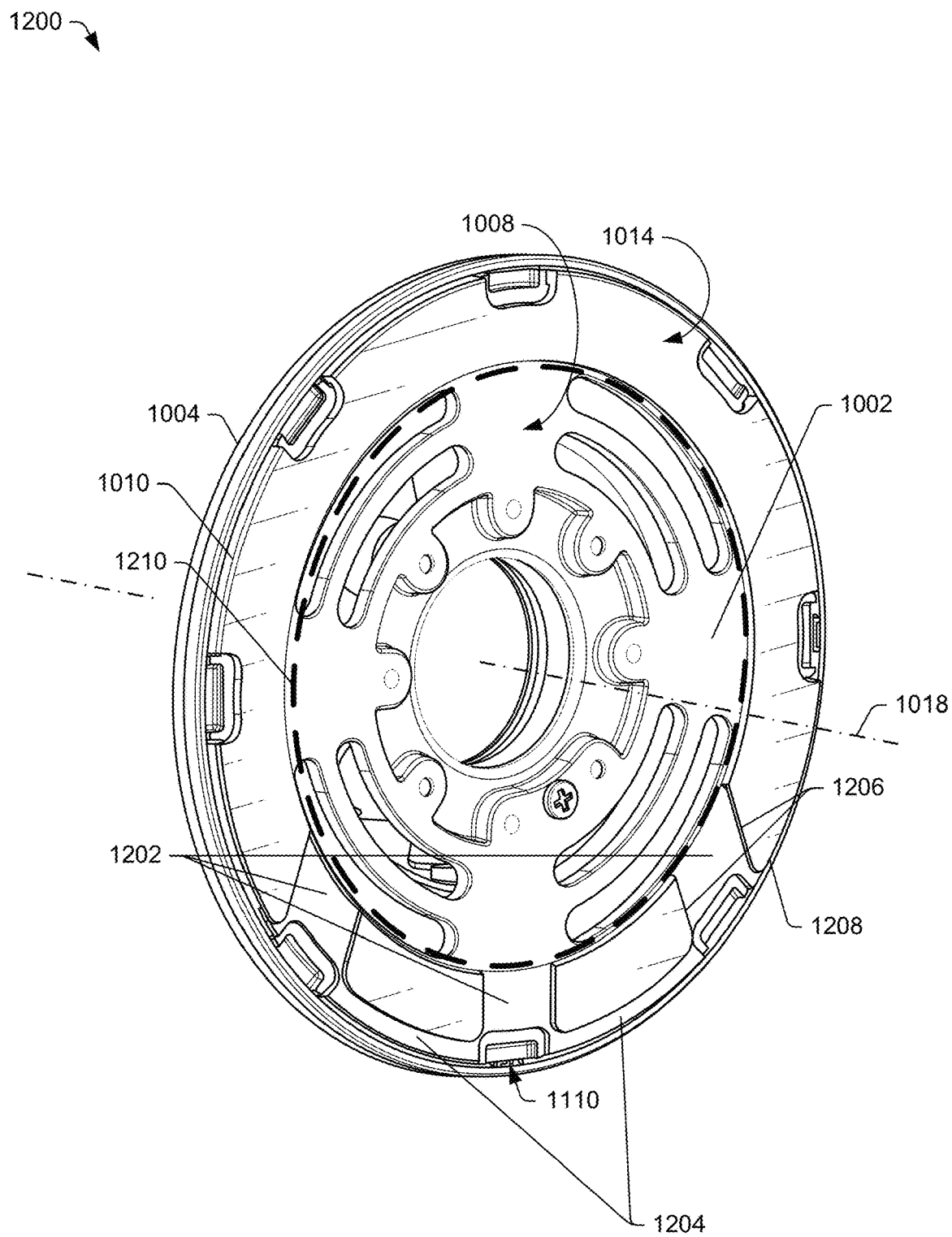
FIG. 12 illustrates a rear isometric view of the wallplate from FIG. 1.

Continuing, FIG. 12 illustrates a rear isometric view 1200 of the wallplate 108 from FIG. 1. As illustrated, the cover plate 1004 is shaped to define a recessed area that supports the trim plate 1002. The mounting gasket 1010 provides a watertight seal between the front side 1006 (in FIG. 10) of the trim plate 1002 and the backside surface 1102 (in FIG. 11) of the cover plate 1004. The mounting gasket 1010 is also configured to provide a watertight seal between the trim plate 1002 and the wall (or the junction box). Accordingly, the mounting gasket 1010 provides a watertight seal on both the front and back sides 1006 and 1008 of the trim plate 1002. In addition, the mounting gasket 1010 includes multiple drainage slots 1202 (e.g., recessed areas) for water drainage in the event of water ingress into the interior of the wallplate 108. The drainage slots 1202 are defined on the rear exterior side 1014 of the mounting gasket 1010. In addition, the mounting gasket 1010 includes channels 1204 that connect at least some of the drainage slots 1202 along a perimeter (e.g., proximate an edge) of the mounting gasket 1010. Accordingly, if the wallplate 108 is rotated about a center axis (e.g., the center axis 1018), water may exit the wallplate 108 via the drainage slots 1202 and the channels 1204 due to gravity. The drainage slots 1202 and the channels 1204 may have any suitable depth, including a depth substantially within a range of 0.5 millimeter (mm) to 1.5 mm (e.g., a 1.0 mm depth).

Although the illustrated example includes three drainage slots 1202, any suitable number of slots may be implemented, including one, two, three, four, and so forth. For purposes of discussion, three drainage slots 1202 are described, e.g., a middle slot and two outer slots. In aspects, at least one of the drainage slots 1202 (e.g., outer slot) includes sidewalls 1206 that are non-orthogonal to an edge (e.g., edge 1208) of the mounting gasket 1010. Rather, the sidewalls 1206 are oriented to reduce the likelihood of water ingress through the drainage slot 1202 when the wallplate 108 is rotated about the center axis 1018 up to about 45 degrees (depending on the configuration of the junction box to which the wallplate 108 is mounted). However, in the event that water does ingress into one of the drainage slots 1202, the water can drain out of a neighboring drainage slot 1202 via one or more of the channels 1204 or via a center area (e.g., center area 1210) of the mounting gasket 1010. In aspects, water may drain through the drainage slots 1202 and/or the channels 1204 and through the drainage hole 1110 in the cover plate 1004 to exit the interior of the cover plate 1004.

Figure 13:
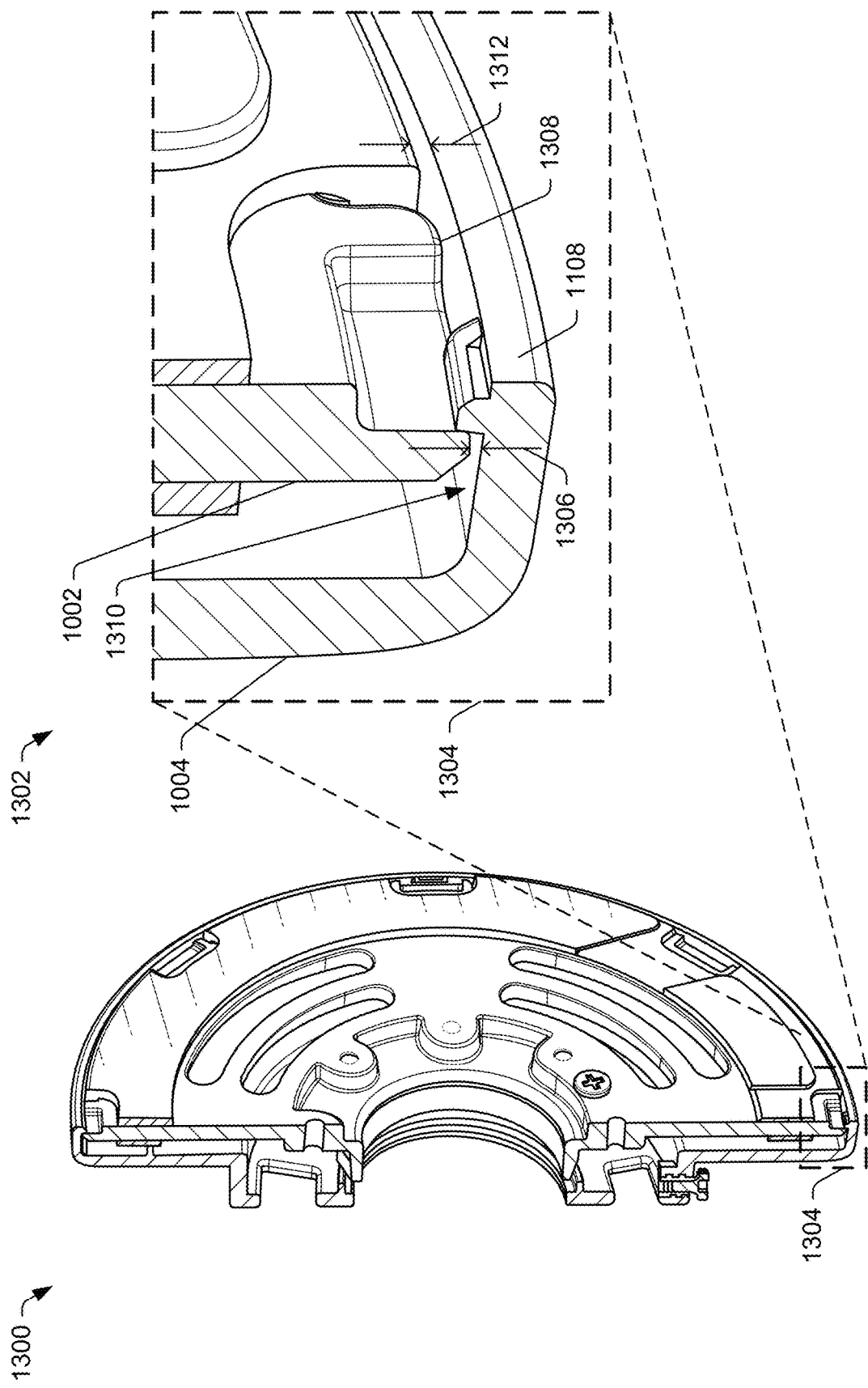
FIG. 13 illustrates a sectional view of the wallplate from FIG. 1 and an enlarged view of a portion thereof.

FIG. 13 illustrates a sectional view 1300 of the wallplate 108 from FIG. 11 and an enlarged view 1302 of a portion 1304 thereof. In the enlarged view 1302, a gap 1306 (e.g., clearance) is defined between a perimeter 1308 of the trim plate 1002 and an inner surface 1310 of the perimeter wall 1108 of the cover plate 1004. The gap 1306 is implemented to enable water drainage. A similar clearance gap (e.g., gap 1312) for water drainage may be defined between the mounting gasket 1010 and the inner surface 1310 of the perimeter wall 1108 of the cover plate 1004. Any suitable size may be implemented for the gaps 1306 and 1312, including a size substantially within a range of 0.25 mm to 0.5 mm (e.g., 0.33 mm).

Water may ingress into the center area 1210 of the wallplate due to an uneven mounting surface (e.g., on the wall around the junction box) or due to improper installation by a user. Accordingly, the drainage slots 1202 and the channels 1204 provide a path for water to exit in the event of water ingress.

Although techniques using and apparatuses for a modular floodlight system are described, it is to be understood that the subject of the appended claims is not necessarily limited to the specific features or methods described. Rather, the specific features and methods are disclosed as example ways in which a modular floodlight system can be implemented.

Some examples are provided below:

A camera system comprising: a camera unit including: an image sensor configured to capture images or video of a scene; and a camera unit PIR sensor having a camera unit FOV extending from the camera system; an accessory unit magnetically coupled with the camera unit, the accessory unit including an accessory unit PIR sensor arranged to have an accessory unit FOV extending from the camera system that is different than and which supplements the camera unit FOV of the camera unit PIR sensor; and a processing unit configured to: receive sensor readings from the accessory unit PIR sensor and the camera unit PIR sensor; detect motion within at least one of the accessory unit FOV or the camera unit FOV based on the received sensor readings; and cause a change in functionality of the camera system in response to detecting motion within at least one of the accessory unit FOV or the camera unit FOV.

The accessory unit may further comprise one or more light subassemblies. The processing unit may be communicatively connected to the accessory unit PIR sensor, the one or more light subassemblies, and the camera unit. The change in functionality of the camera system includes at least one of: activation of the one or more light subassemblies to provide light to an environment of the floodlight system; or activation of the image sensor to begin capturing images or recording video.

The accessory unit FOV of the accessory unit PIR sensor may have a horizontal angular range of approximately 180 degrees.

The accessory unit PIR sensor may include two PIR sensors oriented at 60 to 90 degrees relative to one another.

The accessory unit may further comprise a substrate mounted to a backside of the accessory unit PIR sensor, wherein the accessory unit PIR sensor includes a plurality of pins grounded by the substrate.

The substrate may be mounted to a flexible printed circuit via one or more surface mount technologies and used as a spacer with shielding for the accessory unit PIR sensor.

The accessory unit may further comprise a conductive adhesive positioned between the substrate and the accessory unit PIR sensor to ground the accessory unit PIR sensor and the plurality of pins of the accessory unit PIR sensor.

The accessory unit may further comprise a generally cylindrical metal tube positioned around sidewalls of the accessory unit PIR sensor to provide shielding for the sidewalls of the accessory unit PIR sensor.

The accessory unit may further comprise: a housing; and a PIR lens attached to the housing and having a bowl shape to house the accessory unit PIR sensor.

The camera system may further comprise a wallplate configured to be attached to the accessory unit and mounted to a surface, wherein the wallplate includes: a trim plate having a disk-like shape with front and back sides; and a mounting gasket, the mounting gasket: having a general ring shape; being assembled to the trim plate; and substantially covering a portion of each of the front and back sides of the trim plate.

The mounting gasket may include one or more drainage slots defined in an exterior surface of the mounting gasket for enabling water drainage between the exterior surface of the mounting gasket and the surface to which the wallplate is mounted.

The mounting gasket may include at least two drainage slots and a channel connecting the at least two drainage slots proximate to an edge of the mounting gasket.

The mounting gasket may include at least three drainage slots and a channels connecting the at least three drainage slots proximate to an edge of the mounting gasket, the at least three drainage slots include a middle slot and two outer slots, and the two outer slots include sidewalls that are non-orthogonal to the edge of the mounting gasket to reduce water ingress when the wallplate is rotated about a center axis of the wallplate.

The at least three drainage slots and the channel each have a depth may be substantially within a range of 0.5 mm to 1.5 mm.

The accessory unit may further comprise: a power supply unit; a cable connecting the power supply unit to a power source; and a shrink tube positioned around a portion of the cable proximate to a housing of the accessory unit to provide rigidity to the cable and prevent the cable from being pinched when the of the accessory unit is assembled to the wallplate.

What is claimed is:

1. A camera system comprising:
a camera unit including:
an image sensor configured to capture images of a scene; and
a camera unit passive infrared (PIR) sensor having a camera unit field of view (FOV) extending from the camera system;
an accessory unit magnetically coupled with the camera unit, the accessory unit including an accessory unit PIR sensor arranged to have an accessory unit FOV extending from the camera system that is different than and which supplements the camera unit FOV of the camera unit PIR sensor; and
a processing unit configured to:
receive sensor readings from the accessory unit PIR sensor and the camera unit PIR sensor;
detect motion within at least one of the accessory unit FOV or the camera unit FOV based on the received sensor readings; and
cause a change in functionality of the camera system in response to detecting motion within at least one of the accessory unit FOV or the camera unit FOV.

2. The camera system of claim 1, wherein:
the accessory unit further comprises one or more light subassemblies;
the processing unit is communicatively connected to the accessory unit PIR sensor, the one or more light subassemblies, and the camera unit PIR sensor; and
the change in functionality of the camera system includes at least one of:
activation of the one or more light subassemblies to provide light to an environment of the camera system; or
activation of the image sensor to begin capturing images or recording video.

3. The camera system of claim 1, wherein the accessory unit FOV of the accessory unit PIR sensor has a horizontal angular range of 180 degrees.

4. The camera system of claim 1, wherein the accessory unit PIR sensor includes two PIR sensors oriented at 60 to 90 degrees relative to one another.

5. The camera system of claim 1, wherein the accessory unit further comprises a substrate mounted to a backside of the accessory unit PIR sensor, wherein the accessory unit PIR sensor includes a plurality of pins grounded by the substrate.

6. The camera system of claim 5, wherein the substrate is mounted to a flexible printed circuit via one or more surface mount technologies and used as a spacer with shielding for the accessory unit PIR sensor.

7. The camera system of claim 5, wherein the accessory unit further comprises a conductive adhesive positioned between the substrate and the accessory unit PIR sensor to ground the accessory unit PIR sensor and the plurality of pins of the accessory unit PIR sensor.

8. The camera system of claim 5, wherein the accessory unit further comprises a generally cylindrical metal tube positioned around sidewalls of the accessory unit PIR sensor to provide shielding for the sidewalls of the accessory unit PIR sensor.

9. The camera system of claim 1, wherein the accessory unit further comprises:
   a housing; and
   a PIR lens attached to the housing and having a bowl shape to house the accessory unit PIR sensor.

10. The camera system of claim 1, further comprising a wallplate configured to be attached to the accessory unit and mounted to a surface, wherein the wallplate includes:
    a trim plate having a disk-like shape with front and back sides; and
    a mounting gasket, the mounting gasket:
       having a general ring shape;
       being assembled to the trim plate; and
       substantially covering a portion of each of the front and back sides of the trim plate.

11. The camera system of claim 10, wherein the mounting gasket includes one or more drainage slots defined in an exterior surface of the mounting gasket for enabling water drainage between the exterior surface of the mounting gasket and the surface to which the wallplate is mounted.

12. The camera system of claim 11, wherein the mounting gasket includes at least two drainage slots and a channel connecting the at least two drainage slots proximate to an edge of the mounting gasket.

13. The camera system of claim 11, wherein:
    the mounting gasket includes at least three drainage slots and a channel connecting the at least three drainage slots proximate to an edge of the mounting gasket;
    the at least three drainage slots include a middle slot and two outer slots; and
    the two outer slots include sidewalls that are non-orthogonal to the edge of the mounting gasket to reduce water ingress when the wallplate is rotated about a center axis of the wallplate.

14. The camera system of claim 13, wherein the at least three drainage slots and the channel each have a depth substantially within a range of 0.5 mm to 1.5 mm.

15. The camera system of claim 10, wherein the accessory unit further comprises:
    a power supply unit;
    a cable connecting the power supply unit to a power source; and
    a shrink tube positioned around a portion of the cable proximate to a housing of the accessory unit to provide rigidity to the cable and prevent the cable from being pinched when the accessory unit is assembled to the wallplate.

16. The camera system of claim 1, wherein:
    the accessory unit includes a magnet mount assembly configured to magnetically couple with the camera unit; and
    the magnet mount assembly includes a flexible concave surface that is complementary to a convex outer surface of the camera unit.

17. The camera system of claim 1, wherein:
    the camera unit is a modular camera system; and
    the accessory unit has a modular structure having a magnetic mount that enables 3-axis articulation of the modular camera system.

18. The camera system of claim 1, further comprising a PIR module, the PIR module including:
    a PIR holder;
    a PIR board mounted to a surface of the PIR holder, the PIR board populated with a processing unit communicatively coupled to the accessory unit PIR sensor and configured to operate the accessory unit PIR sensor;
    a PIR flex component assembled to the PIR holder and configured to be attached to the accessory unit PIR sensor; and
    a PIR lens affixed to the PIR holder and configured to cover the accessory unit PIR sensor.

19. The camera system of claim 18, wherein the PIR module further comprises:
    a first gasket positioned between the PIR lens and the PIR holder; and
    a second gasket positioned between the PIR lens and a housing of the accessory unit.

20. The camera system of claim 19, wherein:
    the housing of the accessory unit includes an aperture through which the PIR lens is positioned;
    the PIR lens is configured to attach to an interior surface of the housing of the accessory unit; and
    the accessory unit PIR sensor is positioned within the PIR lens and outside of the housing of the accessory unit.

* * * * *